United States Patent [19]

Schaefer et al.

[11] 4,389,450
[45] Jun. 21, 1983

[54] MULTIPLE LAYER PACKAGING FILM

[75] Inventors: Suzanne E. Schaefer, Neenah; Jack E. Knott, II, Appleton, both of Wis.

[73] Assignee: American Can Company, Greenwich, Conn.

[21] Appl. No.: 238,210

[22] Filed: Feb. 26, 1981

[51] Int. Cl.³ .............................. B32B 7/02; C09J 7/02
[52] U.S. Cl. ...................................... 428/212; 428/36; 428/347; 428/349; 428/355; 428/475.8; 428/483; 428/515; 428/516; 428/520; 428/913
[58] Field of Search ................. 428/36, 347, 343, 349, 428/355, 212, 475.8, 483, 515, 516, 520, 913

[56] References Cited

U.S. PATENT DOCUMENTS

| | | | |
|---|---|---|---|
| 3,202,528 | 8/1965 | James | 428/347 |
| 4,020,228 | 4/1977 | Eastes | 428/347 |
| 4,121,956 | 10/1978 | Sample | 428/349 X |
| 4,218,510 | 8/1980 | Willson | 428/349 |
| 4,294,882 | 10/1981 | Andrews et al. | 428/349 |

Primary Examiner—Thomas J. Herbert, Jr.
Attorney, Agent, or Firm—Stuart S. Bowie; Thomas D. Wilhelm

[57] ABSTRACT

This invention is a multiple layer packaging film in which the outer polymeric layers cooperate to achieve, between themselves, a relatively constant coefficient of friction differential, a fin seal capability, and a lap seal capability; even after the film is stored in wound-up roll form.

12 Claims, 3 Drawing Figures

MULTIPLE LAYER PACKAGING FILM

BACKGROUND OF THE INVENTION

In the making of multiple layer flexible plastic-type films, after the film is produced, it is wound up in roll form for storage or shipment. It is normal to use, as one of the outer layers of the film, a tacky heat sealable material, such as ethylene vinyl acetate. The other outer layer of the film, on its other surface, may be a non-sealant layer composed of a non-tacky type polymer.

If the tacky material is used as the entire composition of the one outer layer, the tackiness may function as an adhesive in the roll, such that the tacky sealant layer sticks to the non-sealant layer.

To avoid the above problem of the tacky sealant layer sticking to the non-sealant layer, it has been normal practice to incorporate a slip additive into the tacky layer to reduce its tackiness. It is known that the slip additive gradually migrates to the outer surface of the tacky layer. When the film has been in roll form and is subsequently unrolled, testing reveals that the coefficient of friction (COF) of the sealant layer has increased since the roll was made, and the COF of the non-sealant layer has descreased.

These films are commonly used with packaging machinery which is sensitive to the COF of both surfaces of the packaging material. Desirably, the COF of the non-sealant layer is about 0.4 to 0.5, and the COF of the sealant layer is 0.2 to 0.3. Since the packaging equipment is sensitive to the COF of the two surfaces of the packaging material, it is highly desirable that the COF of the packaging material be predictable, and substantially constant with time.

It is an object of this invention to provide a multiple layer, heat sealable, flexible packaging material, having a slip additive in the heat seal layer, which material can be stored in roll form, and in which the coefficients of friction of the two surfaces of the film are substantially constant with time.

SUMMARY OF THE INVENTION

The terminology of sealant and non-sealant layers is carried through this writing in the same context as it is used in describing the prior art layer juxtapositions in the Background of the Invention. As the description of the invention unfolds, those skilled in the art will appreciate that the appelation "non-sealant layer" is somewhat of a misnomer because one of the benefits of the invention is that the layer which was the non-sealant layer in the prior art acquires sealing capability in the invention. It will also be appreciated that, while a layer considered as a non-sealant layer in the prior art would not form a good seal with the sealant layer, it may, under appropriate conditions, form heat seals with itself or with some other polymer. Thus the terminology "non-sealant layer" in the prior art refers to the functional nature of that layer relative to the sealant layer. "Non-sealant layer" in the invention refers only to the positioning of the layer in a consistent manner relative to the prior art, and has no meaning relative to the sealant or non-sealant properties of the layer in the invention.

This invention is exemplified by a multiple layer heat sealable packaging sheet structure having, on one of its surfaces, a sealant layer, and on the other surface, a non-sealant layer. The sealant and non-sealant layers are heat sealable each to themselves and to each other. The non-sealant layer has a coefficient of friction between about 0.4 and 2. The sealant layer has a coefficient of friction of less than about 0.3. Importantly, the coefficient of friction of both the sealant and non-sealant layers is substantially constant for a period of at least 30 days when the sheet structure is stored in the form of a continuous web wrapped about a central core, with the sealant and non-sealant layers in surface-to-surface contact.

In preferred structure, the non-sealant layer is a blend which can best be comprehended as substantially a base polymer and a blended-in tacky additive.

About 25% by weight to about 75% of the blend is the base polymeric material which, in unblended composition, has a coefficient of friction of less than about 2.

About 75% by weight to about 25% of the blend is the additive polymeric material which, in unblended composition, has a coefficient of friction greater than 2.

Often, the base polymeric material is an ethylene copolymer, such as ethylene vinyl alcohol. At other times it may by another suitable polymer, chosen, for example, from the group consisting of polyester, polypropylene and nylon.

The additive polymer is usually an ethylene copolymer, and is commonly chosen from the group consisting of ethylene acrylic acid, ethylene methyl acrylate, ethylene ethyl acrylate, ethylene vinyl acetate, and ionomer.

In many cases, the additive polymer in the non-sealant layer is the same as the heat sealable polymer of the sealant layer.

Multiple layer sheet material made according to this invention is capable of forming both fin seals and lap-type seals by heat sealing techniques.

DETAILED DESCRIPTION OF THE INVENTION

Figure 1:
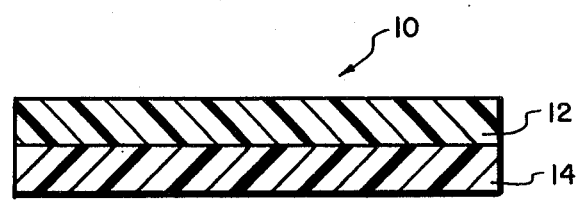
FIG. 1 shows the multiple layer structure of the invention.

The invention in its simplest form is exemplified by FIG. 1, in which a two layer film is generally designated 10. Layer 14 of film 10 is an outside sealant layer having a blended composition of tacky polymeric heat seal material with a slip additive. Layer 12 is a blend of a tacky polymeric heat seal material with a base polymer which is non-tacky.

In general, the function of layer 14 is to serve as a heat seal layer, such as is normally used in making fin-type seals, wherein the areas which are sealed together are portions of the same surface of a sheet-type packaging material. The function of layer 12 is generally that of providing the primary strength and toughness of the film, as well as the gas barrier properties. These functions of layer 12, of course, vary, depending on which polymers or combinations of polymers are chosen for each layer.

The type of structure shown in FIG. 1 may be used, for example, in vertical form, fill, and seal equipment. It is important, in that application, that the coefficient of friction of the normally tacky material used in layer 14 be reduced, so that there is no tacky surface on the film which would stick to the packaging equipment. This is accomplished with slip additives which are known to reduce COF in this type of application. It is also important that the coefficient of friction of layer 12 be maintained and controlled at a relatively high level compared to the COF of layer 14, as the movement of the film through vertical form, fill, and seal packaging equipment is dependent on the friction between the surface of layer 12 and the equipment surfaces. Thus, any variation in the COF of the surface of layer 12 will often manifest itself by improper engagement of the web with the packaging equipment.

The coefficient of friction, as used herein, is that obtained by ASTM D-1894, in which two surfaces of the one material are in frictional surface-to-surface contact. Unless otherwise stated herein, this definition of coefficient of friction is to be used consistently in interpretation of the teaching and the claims.

Figure 2:
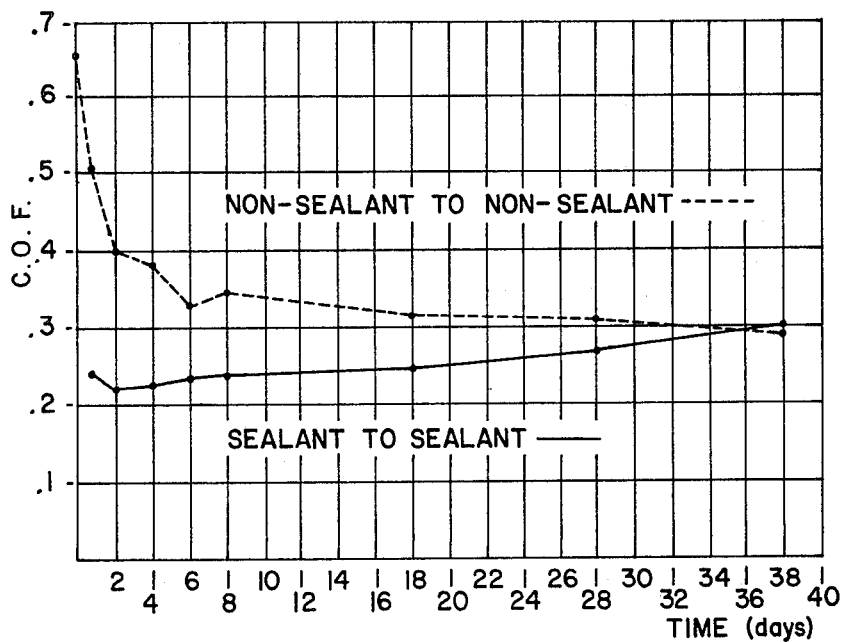
FIG. 2 illustrates the typical problem encountered by film users of the prior art.

The graph of FIG. 2 illustrates the typical problem encountered by film users. The COF of the sealant layer rises with time, and the COF of the non-sealant layer drops with time. Eventually, an equilibrium is reached, wherein the COF of both surfaces is about the same. The equilibrium state is particularly disadvantageous in terms of the non-sealant layer, because the equilibrium COF is so low that the film cannot be most effectively engaged by the packaging equipment.

Figure 3:
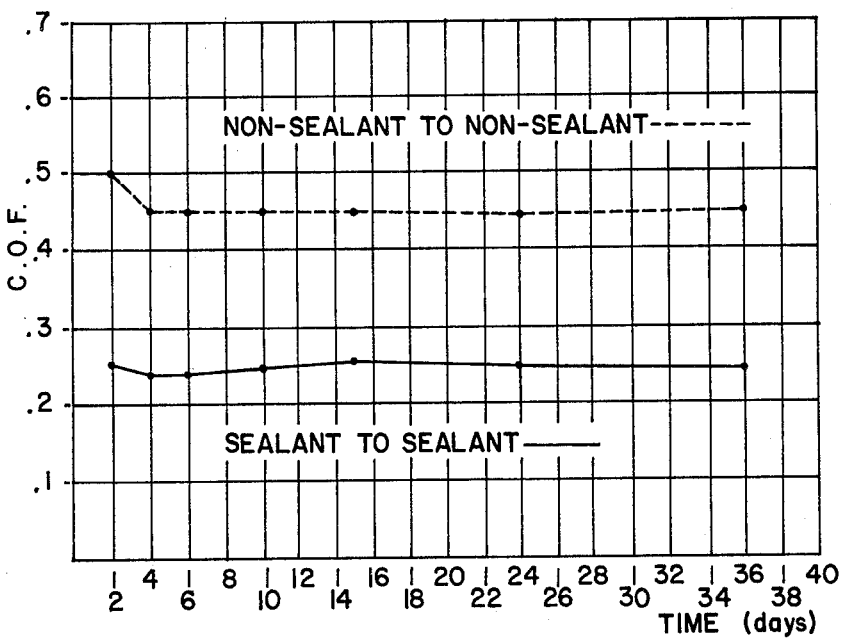
FIG. 3 illustrates the resultant advantage of using the blends of the invention.

The graph of FIG. 3 illustrates the resultant advantage of using the blends of this invention.

Generally, any polymer having a coefficient of friction of less than about 2.0 may be used as the non-tacky polymer in layer 12. Polymer compositions having COF below 0.4 cannot be engaged by the packaging equipment without excessive slippage or excessive equipment wear. Polymer compositions having COF greater than about 2.0 have a tendency to stick to the equipment.

Non-tacky materials preferred for use in layer 12 provide a high barrier to gaseous infusion into the finished package. These preferred materials include nylon-type polyamide, ethylene vinyl alcohol, polyester, and oriented polypropylene. It is notable that at least some of these polymers are known to have relatively poor heat seal characteristics, and thus they are generally not considered acceptable materials for use in layers which will form heat seals.

Also acceptable, but somewhat less desirable are unoriented polypropylene and polyethylene.

The tacky polymer in layer 14 may be any heat sealable polymer which normally is tacky, and thus requires the use of a slip additive. Polymers which provide excellent performance in specific applications are ethylene acrylic acid, ethylene methyl acrylate, ethylene ethyl acrylate, ethylene vinyl acetate, and ionomer. The tacky polymer may be a blend of tacky polymers, the exact composition being unimportant to the success of the invention. Layer 14 does include up to about 25% by weight slip additive. It may contain minor amounts of non-tacky polymer. For use in vertical form, fill and seal equipment, it is important that the resulting layer 14 have a coefficient of friction of no more than 0.3.

Blended into the layer 12 is a tacky polymer chosen from the same group of tacky polymers described for layer 14. Thus, highly desirable tacky polymers for inclusion into layer 12 are ethylene acrylic acid, ethylene methyl acrylate, ethylene ethyl acrylate, ethylene vinyl acetate and ionomer.

The final composition of layer 12 is from about 25% to about 75% non-tacky polymer, and 75% to about 25% tacky polymer. A preferred range of compositions has 60% to 75% non-tacky polymer and 25% to 40% tacky polymer.

As evidenced by the above description, the operation and utility of the invention are controlled by the compositions of the two layers on the two outer surfaces of the multiple layer structure. The presence or absence of other layers of material between the two outer layers is of little consequence other than as regards transmission of the sealing heat through the entire structure for heat sealing purposes. Where this may be a problem, the heat may, of course, be applied in known manner directly to the sealing surfaces in a pre-heating operation ahead of the operation of joining the surfaces.

Thus is the invention applicable to a large family of multiple layer films having polymeric layers on both surfaces. Between the two outer layers, other layers, olymeric and non-polymeric, may be added. These added layers may function as barriers, as adhesives, or as graphics carriers, for example. Non-polymeric materials such as paper and metal foil can be advantageously included.

The film of this invention may be constructed in any manner. For example, the entire film may be coextruded. Portions may be adhesive laminated, or extrusion laminated. In some cases, it is desirable that certain layers and particularly the non-sealant layer be oriented, either uniaxially, or biaxially. While the usual limitations on reheating of the oriented materials must be observed, these orienting operations are fully compatible with the invention.

In a typical coextrusion process, the sealant layer composition is supplied to a first extruder. The non-sealant layer composition is supplied to a second extruder. The two compositions are extruded through the extruders and fed to a die where they are formed into a single, multiple layer film.

EXAMPLE 1

As exemplary of the prior art, Chemplex 3024 low density polyethylene is used as the non-sealant layer material. The sealant layer is a blend of 55% DuPont Elvax 560 ethylene vinyl acetate, 30% DuPont Surlyn 1707 ionomer and 15% DuPont CE 9619-1 slip agent. The slip agent is 40,000 ppm erucamide, 40,000 ppm stearamide, and 200,000 ppm silica antiblock in an ethylene vinyl acetate base resin. The two compositions of the sealant and non-sealant layers are coextruded through plastics extruders to form a two layer film, and wound up in roll form, so that the sealant and non-sealant layers are juxtaposed adjacent each other, face-to-face, in the roll. The coefficient of frication of each surface of the film, against itself in surface-to-surface frictional contact, is measured, and is shown in the graph of FIG. 2. The change in COF with time, shown in FIG. 2, is exemplary of the variation in COF with time in prior art structures. It should be noted here that the EXAMPLE 1 material forms good sealant layer to sealant layer seals of the fin type; but does not form good lap seals, sealant layer to non-sealant layer.

EXAMPLE 2

A coextruded film is produced as in EXAMPLE 1 wherein the composition of the non-sealant layer is 75% Chemplex 3024 and 25% DOW 455 ethylene acrylic acid. The coefficients of friction of the surfaces are shown in the graph of FIG. 3. Note that, after moderate adjustment for the first four days, the coefficient of friction is essentially constant throughout the test period. Also the differential between the two coefficients of friction is substantially constant. The film forms good sealant layer to sealant layer seals of the fin type; and, surprisingly, also forms good lap-type seals; sealant layer to non-sealant layer.

EXAMPLES 3-12

The compositions of Examples 3-12 are detailed in Table 1. Examples 1 and 2 are repeated for comparison. These films are coextruded using the same process as Examples 1 and 2. All of examples 3-12 show constant coefficients of friction similar to those of Example 2, and form good seals of both the fin type, sealant layer to sealant layer, and of the lap type, sealant layer to non-sealant layer.

TABLE 1

| Example No. | Non-Sealant Layer Composition | Sealant Layer Composition |
|---|---|---|
| 1. (Prior Art) | LDPE | 55% EVA<br>30% Surlyn<br>15% slip agent |
| 2. | 75% LDPE<br>25% EAA | 55% EVA<br>30% Surlyn<br>15% slip agent |
| 3. | 75% EVOH[1]<br>25% EAA[2] | 55% EVA<br>30% Surlyn<br>15% slip agent |
| 4. | 50% EVOH<br>50% EAA | 55% EVA<br>30% Surlyn<br>15% slip agent |
| 5. | 75% EVOH<br>25% EMA[3] | 55% EVA<br>30% Surlyn<br>15% slip agent |
| 6. | 50% EVOH<br>50% EMA | 55% EVA<br>30% Surlyn<br>15% slip agent |
| 7. | 75% EVOH<br>25% EEA[4] | 55% EVA<br>30% Surlyn<br>15% slip agent |
| 8. | 50% EVOH<br>50% EEA | 55% EVA<br>30% Surlyn<br>15% slip agent |
| 9. | 75% EVOH<br>25% EVA[5] | 55% EVA<br>30% Surlyn<br>15% slip agent |
| 10. | 50% EVOH<br>50% EVA | 55% EVA<br>30% Surlyn<br>15% slip agent |
| 11. | 75% EVOH<br>25% Surlyn[6] | 55% EVA<br>30% Surlyn<br>15% slip agent |
| 12. | 50% EVOH<br>50% Surlyn | 55% EVA<br>30% Surlyn<br>15% slip agent |

[1] EVOH = Nippon Gosei GLD-E ethylene vinyl alcohol
[2] EAA = DOW 455 ethylene acrylic acid
[3] EMA = Gulf 2205 ethylene methyl acrylate
[4] EEA = Union Carbide DPDA-6182 ethylene ethyl acrylate
[5] EVA = DuPont Elvax 560 ethylene vinyl acetate
[6] Surlyn — Surlyn 1707 ionomer from DuPont Company It should be appreciated that the examples are but a few illustrations of the use of this invention, as the invention is limited only within the context of the criteria for the sealant and non-sealant layers. The requirements of the sealant layer are these: It must contain tacky, sealant type material, and an effective amount of a slip additive which controls the tackiness of the tacky material.

The requirements of the non-sealant layer are these: It must contain a blend of about 25% to about 75% of a non-tacky polymer, and about 75% to about 25% of the tacky polymer having a COF of at least about 2.

The synergistic benefit, of lap sealability, has positive implications for the form, fill, and seal packaging business. Significantly, this will provide users of lap seal equipment substantially greater freedom in specifying the functional parameters of their packaging structures. Thus they were heretofore precluded from using many desirable structures because the structures were only capable of forming fin seals. Now those structures can be used by applying the principles of this invention.

In most cases, it is desirable that the combination of the composition of the sealant layer and the non-tacky polymer be selected such that the non-tacky polymer has a softening temperature at least 10° F. higher than the desired sealing temperature of the sealant layer. This will allow for temperature differentials across the film thickness, during heat sealing, without the non-sealant layer sticking to the seal equipment. Desirably, the heat seal temperatures of the sealant layer composition and the tacky material in the non-sealant layer are substantially similar.

Thus it is seen that this invention provides a multiple layer, heat sealable, flexible packaging material, having a slip agent in the heat seal layer, which material can be stored in roll form, and in which the coefficient of friction of the two surfaces of the film are substantially constant with time.

This invention also provides a means of providing lap seal capability to a large family of multiple layer packaging materials which heretofore were capable of making only fin-type seals, wherein the areas which are sealed together are portions of the same surface of the packaging material, when the package is made from a single piece of the material.

While the COF of the sealant layer has been described as being no greater than 0.3 for use with vertical form, fill, and seal equipment, this invention has application to any flexible sheet structure where the heat seal layer contains an additive to affect slip or blocking.

Likewise the COF of the non-sealant layer has been described as being between 0.4 and 2. Particularly the 0.4 limit could be lower for use on other than vertical form, fill and seal equipment.

While the invention has been described using illustrations and examples, it is not intended that it be limited by these. Rather, it should be construed and limited only by the appended claims.

What is claimed is:

1. A multiple layer heat sealable packaging sheet structure comprising: on one side thereof, a sealant layer; and on the other side thereof, a non-sealant layer, said sealant and non-sealant layers being heat sealable each to themselves and to each other; said non-sealant layer being a blend of about 25 percent to about 75 percent of a first base polymeric material which, in unblended composition, has a coefficient of friction of less than about 2, and about 75 percent to about 25 percent of a second blended-in tacky additive polymeric material which, in unblended composition, has a coefficient of friction greater than 2; said sealant layer being a blend of a tacky heat sealable polymer and up to about 25 percent of a slip additive.

2. A sheet structure as in claim 1 wherein said base polymeric material is an ethylene copolymer.

3. A sheet structure as in claim 1 wherein said base polymeric material, in unblended composition, has a coefficient of friction of at least 0.4, said non-sealant layer has a coefficient of friction of at least 0.4, and said sealant layer has a coefficient of friction of no greater than 0.3.

4. A sheet structure as in claim 1 wherein a substantial portion of the composition of said sealant layer is the same as the composition of said second polymeric material in said first layer.

5. A sheet structure as in claim 1 or 3, said sheet structure being capable of forming lap-type seals by heat sealing techniques.

6. A sheet structure as in claim 1 wherein said non-sealant layer comprises, as a major component of said base polymeric material, a polyolefin.

7. A sheet structure as in claim 6, wherein said tacky polymeric material is an ethylene copolymer.

8. A sheet structure as in claim 6 wherein said tacky polymeric material is chosen from the group consisting of ethylene acrylic acid, ethylene methyl acrylate, ethylene ethyl acrylate, ethylene vinyl acetate, and ionomer.

9. A sheet structure as in claim 1 wherein said non-sealant layer is biaxially oriented.

10. A sheet structure as in claim 1 or 9 wherein said base polymeric material is chosen from the group consisting of ethylene vinyl alcohol, polyester, polypropylene and nylon.

11. A sheet structure as in claim 1 wherein, in the blend of said non-sealant layer, said base polymeric material is chosen from the group consisting of ethylene vinyl alcohol, polyester, polypropylene and nylon; and said tacky polymeric material is chosen from the group consisting of ethylene acrylic acid, ethylene methyl acrylate, ethylene ethyl acrylate, ethylene vinyl acetate, and ionomer.

12. A sheet structure as in claim 11 wherein the composition of said sealant layer comprises up to 25 percent of a slip additive, and the remainder is chosen from the group consisting of ethylene acrylic acid, ethylene methyl acrylate, ethylene ethyl acrylate, ethylene vinyl acetate and ionomer.

* * * * *